(No Model.)
A. C. ROBBINS.
ELECTRIC PROTECTIVE SYSTEM.
No. 419,710. Patented Jan. 21, 1890.
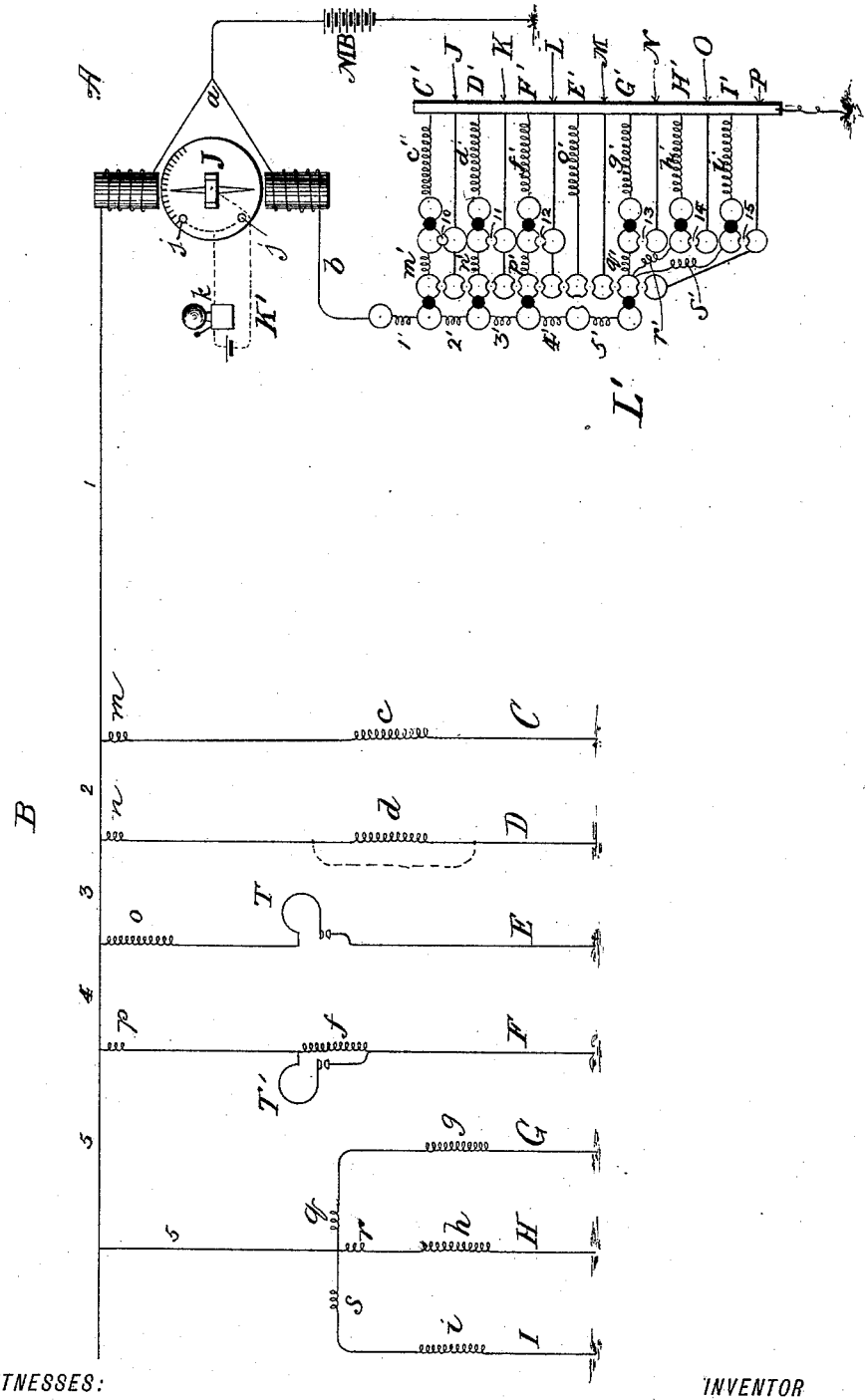
WITNESSES:
INVENTOR
Arthur C. Robbins
BY
ATTORNEY.

UNITED STATES PATENT OFFICE.

ARTHUR C. ROBBINS, OF BROOKLYN, NEW YORK.

ELECTRIC PROTECTIVE SYSTEM.

SPECIFICATION forming part of Letters Patent No. 419,710, dated January 21, 1890.

Application filed August 1, 1889. Serial No. 319,420. (No model.)

*To all whom it may concern:*

Be it known that I, ARTHUR C. ROBBINS, a citizen of the United States, residing in Brooklyn, in the county of Kings and State of New York, have invented certain new and useful Improvements in Electric Protective Systems, of which the following is a specification.

My invention relates to fire and burglar alarm systems in particular and to all electric signaling systems in general.

The object of the invention is primarily to provide a simple and effective system in which a plurality of transmitting points or stations may be operatively connected with a central office through one and the same main line. Such a system necessarily embraces central-office apparatus capable of determining whence each signal comes, and my purpose is to provide such apparatus in the simplest form possible.

My improved system involves an apparatus whereby any number of signals may be received successively at short intervals and the location whence each comes determined with ease and dispatch.

The system consists, generally, of an exterior circuit equipped with resistances, thermostats, or any other transmitting apparatus at the location to be protected, in connection with an interior or central-office circuit which is a fac-simile, so far as the arrangement and value of the resistances are concerned, of the external circuit. I also locate at the central office a single alarm apparatus, which is operated whenever a disturbance occurs on the external circuit to notify the attendant of the fact. To locate a disturbance I have simply to disturb the central-office circuit and make its condition the same as that of the disturbed exterior circuit. This I am able to accomplish by means of the following-described apparatus.

Referring to the accompanying drawing, the figure represents a general diagram of the circuits and apparatus.

In the description which follows I shall refer to the interior or central-office circuit as the "miniature circuit."

Referring to the drawing by letter, A represents the central office, and B the main external circuit. The external circuit consists of a trunk-line, its outer end being "dead," and grounded branch lines C, D, E, F, G, H, and I, running to the points or locations to be protected, and including at such points or locations resistances $c$, $d$, T, $f$, $g$, $h$, and $i$. Each resistance is of a definite value, and there are no two values alike or so nearly alike as to confuse.

T T' represent open-circuit thermostats, which are adapted to close the circuit through their respective branches when overheated by a conflagration.

$m$, $n$, $o$, $p$, $q$, $r$, and $s$ represent, respectively, the known resistances of the grounded branches from the trunk-line up to the protective resistances. These resistances are preferably regulated, respectively, to bear a certain ratio to the protective resistances.

The central-office apparatus includes a main grounded battery MB, a differential galvanometer J, a local-alarm circuit K', and the miniature L'. The main circuit from battery MB branches at $a$, one branch including one of the coils of the differential galvanometer, the main exterior circuit, its branches, and ground, while the other includes the opposing coil of the galvanometer, the miniature, and ground.

The galvanometer is fitted with two contacts $j$ $j$, either of which forms one terminal of a local circuit K, the other terminal being the galvanometer-needle. The local circuit includes a vibrating bell $k$ or any other kind of alarm device.

The miniature consists of a main line $b$, containing the resistances 1', 2', 3', 4', and 5', respectively, equaling the resistances of trunk-line B between the points where the grounded branches connect therewith, (represented by 1, 2, 3, 4, and 5.) From this main line branches C', D', E', F', G', H', and I' lead to the ground. These branches correspond, respectively, with the grounded branches C, D, E, F, G, H, and I of the main exterior circuit and contain resistances which equal in value and correspond in arrangement with the resistances in the branches of the exterior circuit. For instance, branch C contains definite resistances $c$ and $m$ and the corresponding branch C' of the miniature contains resistances $c'$ and $m'$ of the same values, respectively.

In the miniature a number of short circuits to ground J, K, L, M, N, O, and P are arranged alternately with the branches, as shown. A number of plug-switches are placed in the several branches and arranged so that the several circuits may be completed and broken at will, and also so that any or all of the resistances in the branches may be short-circuited. The black circles represent the switch-plugs, and upon inspection the condition of the circuits (whether open or closed) will be found to correspond with the condition of the exterior circuit.

The miniature is shown in diagram for convenience; but in practice the same may be suitably incased and the several plug-switches arranged together on a switch-board for convenient manipulation.

The operation of the system is as follows: In the normal condition of the system, inasmuch as the exterior and miniature circuits are counterparts of each other, the needle of the galvanometer will stand at zero. Let us suppose now that a disturbance of the exterior circuit occurs, that the resistance $d$ in branch D has been short-circuited by a burglar, as indicated in dotted lines. An ordinary short-circuit of these resistances will be the equal of breaking the resistance entirely and bridging the break by a line having no practical resistance. Inasmuch as the resistance of the two circuits now differ, the galvanometer-needle will be deflected and will close the local circuit K, ringing the alarm and notifying the attendant of trouble. To locate the trouble, the attendant has to alter the condition of the miniature to that of the disturbed exterior circuit. When he has accomplished this, the galvanometer will again point to zero. To make this balance, the attendant may first short-circuit the several resistances $c'$, $d'$, $f'$, $g'$, $h'$, and $i'$ by inserting the plug at the points 10, 11, 12, 13, 14, and 15. When he inserts the plug at the point 11, he finds that the galvanometer-needle moves back to zero, indicating that he has changed the condition of the miniature to agree with that of the external circuit, and that the disturbance is caused by a simple shunt around protective resistance $d$ of the exterior circuit.

If the attendant cannot effect a balance by the above process, he then knows that the disturbance is caused in some other manner. Possibly the burglar has broken one of the branches. In such a case he successively opens the branches C', D', F', G', H', and I' by removing any of the plugs in the branches, and the balance is obtained when the branch corresponding to the one broken in the exterior circuit is opened.

The operation of the thermostats is as follows: Should the thermostat T become expanded by overheating sufficiently to complete a circuit to earth through E, a reduction of resistance occurs, which is balanced by placing E' in circuit, thereby locating the fire at E. The other thermostatic signals are located in a similar manner. Should all the alarms on a circuit consist of thermostats, it is only necessary to ground the distant terminal of B through a high resistance, thereby insuring continuity of circuit, and to have simply a like resistance in the miniature circuit.

It is of course understood that the miniature and its galvanometer need not necessarily equal in resistance that of the external circuit. So long as an equal magnetic proportion is obtained conductive capacity is immaterial.

Having thus described my invention, I claim—

1. The combination, with a source of electricity, of two circuits therefrom, one a protective or exterior circuit and the other a detective or interior circuit, branches of both circuits connected in multiple arc, means for altering the condition of the two circuits to render them of equal resistances, and means for indicating the difference of resistance between the two circuits, substantially as set forth.

2. In an electric protective system, the combination, with a main battery, of a circuit therefrom divided into two branches, one of said branches forming an exterior circuit and the other forming an interior or central-office circuit, the said branches including, respectively, the opposing coils of a differential galvanometer, each of the said branches being subdivided into an equal number of other branches connected in multiple arc containing specific resistances, the resistances in the exterior circuit being of equal values, respectively, with the resistances in the interior circuit, substantially as described.

3. In an electric protective system, the combination, with a main battery, of a circuit therefrom divided into two branches, one of said branches forming the exterior circuit and the other forming an interior or central-office circuit, the said branches including, respectively, the opposing coils of a differential galvanometer, each of the said branches being subdivided into an equal number of other branches connected in multiple arc containing specific resistances, the resistances in the exterior circuit being of equal values, respectively, with the resistance in the interior circuit, and means for altering or affecting the interior or office circuit to compensate for disturbances in the external circuit, for the purpose set forth.

4. In an electric protective system, a single source of electricity, in combination with two separate circuits emanating therefrom, one an external circuit and the other an internal or office circuit, a plurality of resistances connected in multiple arc in each circuit, a differential instrument whose two sides or coils are included, respectively, by the two circuits and switches, and supplemental or branch circuits arranged in connection with said internal circuit, whereby its condition may be made to coincide with the condition of the external circuit, and mechanism whereby changes in the internal circuit may be made to correspond with disturbances in the external circuit, substantially as described.

In witness whereof I have hereunto signed my name in the presence of two subscribing witnesses.

ARTHUR C. ROBBINS.

Witnesses:
WM. A. ROSENBAUM,
THOMAS K. TRENCHARD.